United States Patent
Sato et al.

(10) Patent No.: US 8,615,036 B2
(45) Date of Patent: Dec. 24, 2013

(54) GENERATING INTERPOLATED FRAME OF VIDEO SIGNAL WITH ENHANCEMENT FILTER

(75) Inventors: Teruyuki Sato, Kawasaki (JP); Takashi Hamano, Kawasaki (JP); Kohji Yamada, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 801 days.

(21) Appl. No.: 12/458,101

(22) Filed: Jun. 30, 2009

(65) Prior Publication Data
US 2010/0060798 A1  Mar. 11, 2010

(30) Foreign Application Priority Data
Sep. 9, 2008  (JP) .................................. 2008-230957

(51) Int. Cl.
H04N 11/02 (2006.01)

(52) U.S. Cl.
USPC ................. 375/240; 375/240.14; 375/240.16; 348/241; 348/441; 348/625; 382/233; 382/239

(58) Field of Classification Search
None
See application file for complete search history.

(56) References Cited

U.S. PATENT DOCUMENTS

| | | | |
|---|---|---|---|
| 6,900,846 B2 | 5/2005 | Lee et al. | |
| 7,587,091 B2* | 9/2009 | Loukianov et al. | 382/239 |
| 7,602,440 B2 | 10/2009 | Nishi et al. | |
| 8,259,804 B2* | 9/2012 | Lu | 375/240.14 |
| 8,335,258 B2* | 12/2012 | Okumura et al. | 375/240.16 |
| 8,471,959 B1* | 6/2013 | Zhang et al. | 348/441 |
| 2002/0047919 A1* | 4/2002 | Kondo et al. | 348/441 |
| 2003/0174777 A1* | 9/2003 | Itoh et al. | 375/240.16 |
| 2005/0013496 A1* | 1/2005 | Bruls et al. | 382/239 |
| 2007/0070221 A1* | 3/2007 | Nishi et al. | 348/241 |
| 2007/0091997 A1 | 4/2007 | Fogg et al. | |
| 2007/0268967 A1 | 11/2007 | Demos | |
| 2008/0159391 A1* | 7/2008 | He et al. | 375/240.16 |
| 2009/0257502 A1* | 10/2009 | Ye et al. | 375/240.16 |
| 2009/0257668 A1* | 10/2009 | Ye et al. | 382/233 |

(Continued)

FOREIGN PATENT DOCUMENTS

| | | |
|---|---|---|
| JP | 2002-027414 | 1/2002 |
| JP | 2003-069859 | 3/2003 |

(Continued)

OTHER PUBLICATIONS

Koivunen, Tero et al., "Motion estimation using combined shape and edge matching", Signal Processing: Image Communication, col. 6, No. 3, pp. 241-252, Jun. 1, 1994.

(Continued)

*Primary Examiner* — Tung Vo
*Assistant Examiner* — Luis M Perez
(74) *Attorney, Agent, or Firm* — Staas & Halsey LLP

(57) ABSTRACT

In a video signal processing device that generates an interpolated frame between original-image frames formed by an existing video signal, a frame interpolation unit generates pixel interpolation information indicating for each pixel a process in which a pixel forming the interpolated frame is generated. Next, an enhancement-filter-coefficient adjusting unit determines for each pixel a level of enhancement to be applied to the pixel forming the interpolated frame by using pixel interpolation information, and adjusts for each pixel a coefficient of an enhancement filter according to a determined level. An enhancement-filter applying unit then applies the enhancement filter of which coefficient is adjusted for each pixel, to each pixel forming the interpolated frame.

4 Claims, 11 Drawing Sheets

(56) References Cited

U.S. PATENT DOCUMENTS

| | | | |
|---|---|---|---|
| 2010/0054336 A1* | 3/2010 | Okumura et al. | 375/240.16 |
| 2010/0091185 A1 | 4/2010 | Ueno et al. | |
| 2010/0110300 A1* | 5/2010 | Ueno et al. | 348/625 |

FOREIGN PATENT DOCUMENTS

| | | |
|---|---|---|
| JP | 2004-080252 | 3/2004 |
| JP | 2004-518339 | 6/2004 |
| JP | 3619542 | 11/2004 |
| JP | 2006-081150 | 3/2006 |
| JP | 2006-91412 | 4/2006 |
| JP | 2006-270823 | 10/2006 |
| JP | 3865975 | 10/2006 |
| JP | 2006-332904 | 12/2006 |
| JP | 2006-332950 | 12/2006 |
| JP | 2007-281542 | 10/2007 |
| JP | 2008-295022 | 12/2008 |
| WO | 02/056589 | 7/2002 |
| WO | 03/100724 | 12/2003 |
| WO | 2004/006558 | 1/2004 |

OTHER PUBLICATIONS

Extended European Search Report for corresponding European Application 09008447.6-2218; dated Dec. 23, 2009.

Office Action mailed Oct. 16, 2012 in corresponding Japanese Patent Application No. 2008-230597 (2 pages) (2 pages English translation).

\* cited by examiner

| 0 | -B | 0 |
|---|----|---|
| -B | 4B | -B |
| 0 | -B | 0 |

COEFFICIENT B OF ENHANCEMENT FILTER:= $\alpha \times B$ $\alpha = 1$ IF LEVEL OF ENHANCEMENT IS NOT CHANGED
$\alpha > 1$ IF LEVEL OF ENHANCEMENT IS INCREASED

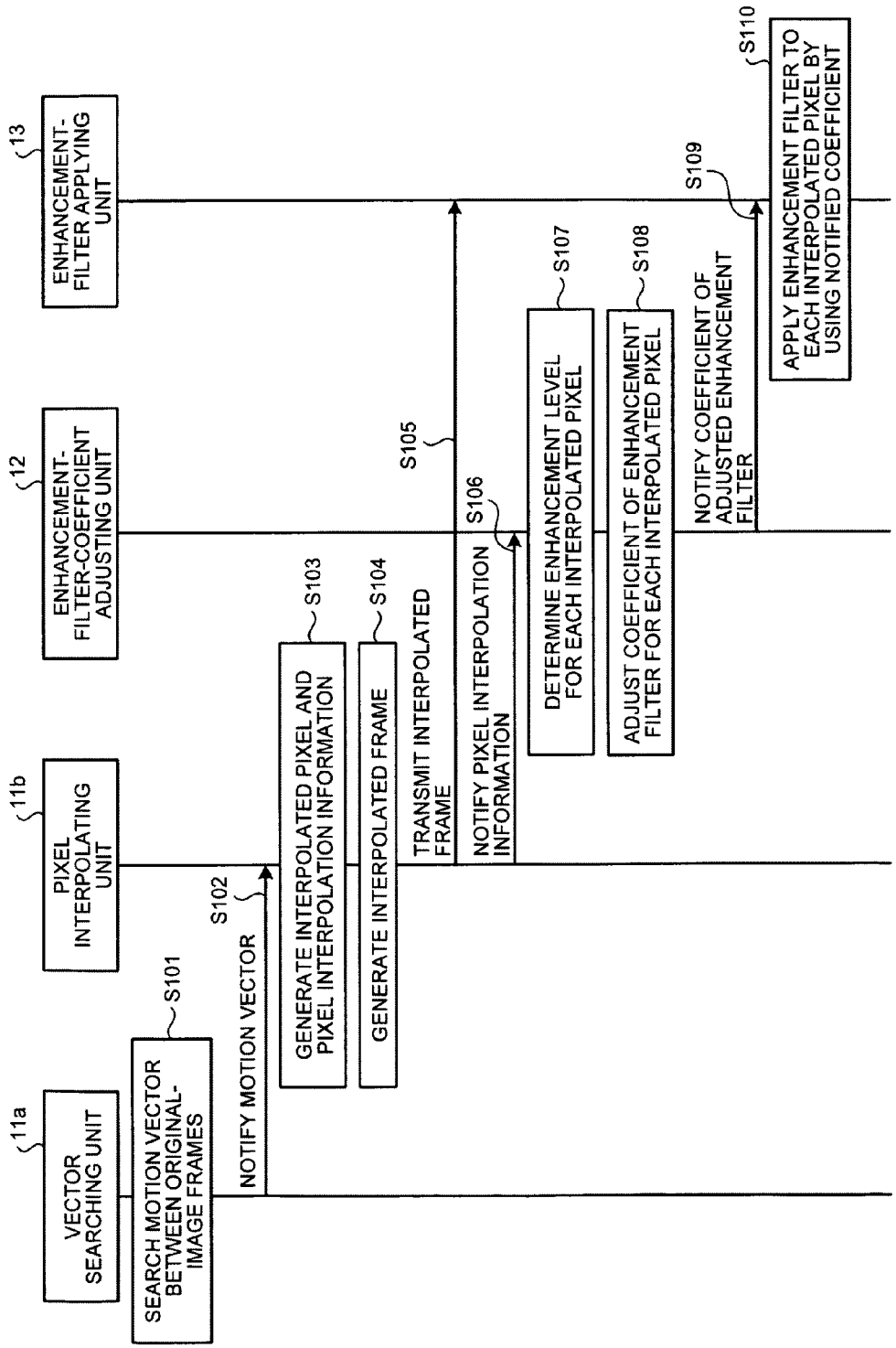

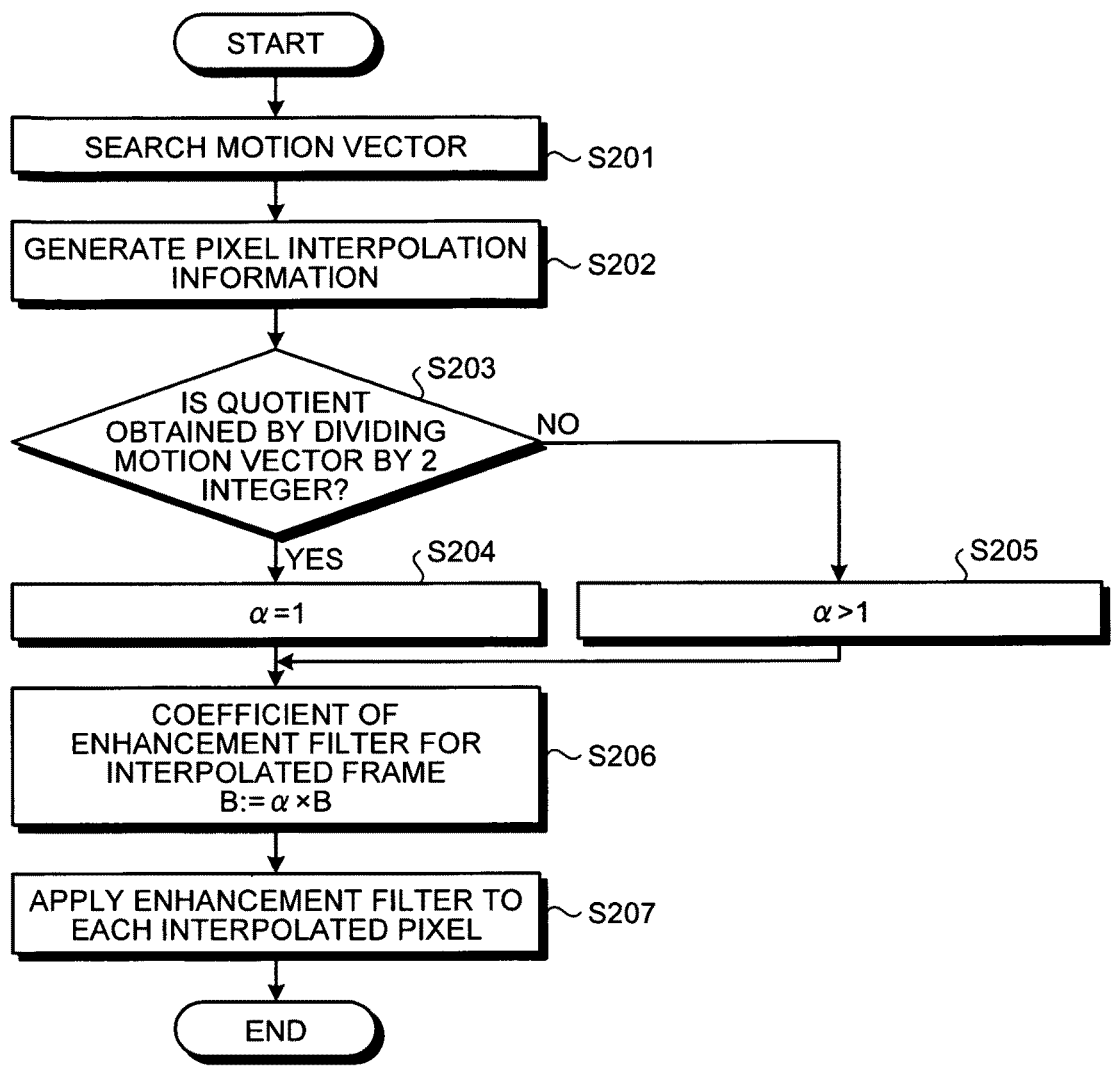

GENERATING INTERPOLATED FRAME OF VIDEO SIGNAL WITH ENHANCEMENT FILTER

CROSS-REFERENCE TO RELATED APPLICATION

This application is based upon and claims the benefit of priority of the prior Japanese Patent Application No. 2008-230957, filed on Sep. 9, 2008, the entire contents of which are incorporated herein by reference.

FIELD

The embodiments discussed herein are directed to a video signal processing device, a video signal processing method, and a video signal processing program.

BACKGROUND

Recently, televisions having a large and thin screen as represented by liquid crystal displays (LCD) and plasma display panels (PDP) are the mainstream of television markets. In the televisions using liquid crystal displays, blur of images is reported to occur as compared with self-emitting plasma displays, due to a system called "hold display" of continuously displaying the same image for 16.7 microseconds (1/60 second). This blur is considered to occur due to a mismatch between a movement of eyeballs and a movement of an image because of a continuous still image on the screen while the eyeballs move continuously following the movement of images on the screen. To improve this moving image characteristic, shortening a holding time is effective. Therefore, nowadays many liquid crystal displays employ double-speed display.

To achieve double-speed display, there are a method of inserting a black-screen frame between original-image frames formed by existing video signals, and a method of inserting an interpolated frame between original-image frames. FIG. 14 is a schematic diagram for explaining a conventional technique. As the method of inserting an interpolated frame, there are a double-speed display method of inserting one interpolated frame between original-image frames, and a quadruple-speed display method of inserting three interpolated frames between original-image frames, as depicted in FIG. 14. As a method of inserting an interpolated frame, there is also a quintuple-speed display method of converting a 24-frame cinema video into 120 frames per second (fps). Because an interpolated frame is generated as an intermediate image to interpolate between original-image frames, blur occurs in displayed images. Therefore, when the number of inserted frames increases, clearness of moving images (or moving pictures) is lost.

Conventionally, to decrease the blur that occurs in an enlarged (or interpolated) frame, an enhancement processing method (enhancer) for enhancing an edge of an image has been disclosed. The enhancement processing is performed to detect an edge of an image for each pixel that forms a frame, and apply an enhancement filter to an edge when detected, to distinctly emphasize a brightness difference to a direction of the edge. There have been disclosed a method of controlling a coefficient of an enhancement filter used for enhancement processing in a time axis direction, based on a result of searching a motion vector, and a method of generating brightness of an interpolated frame based on reliability of a motion vector for each pixel group.

Such a conventional technology is exemplarily disclosed in Japanese Laid-open Patent Publication No. 2006-91412 and Japanese Patent Application National Publication No. 2004-518339

The conventional techniques described above have a problem that proper enhancement processing may not be performed on a stream into which interpolated frames are inserted. For example, when conventional enhancement processing is applied to a stream into which interpolated frames are inserted, original-image frames that are not required to be enhanced are also enhanced, and therefore proper enhancement is not performed. Further, the conventional enhancement processing uniformly applies an enhancement filter to whole a frame. However, because the blur of the interpolated frames does not uniformly occur in all pixels in a frame, there are problems such that a still text subtitle is enhanced too much, and thus proper enhancement cannot be made.

SUMMARY

According to an aspect of an embodiment of the present invention, a video signal processing device that generates an interpolated frame between original-image frames formed by existing video signals, includes a pixel-information generating unit that generates information indicating for each pixel a process in which a pixel forming the interpolated frame is generated; a coefficient adjusting unit that determines for each pixel a level of enhancement to be applied to the pixel forming the interpolated frame by using the information generated by the pixel-information generating unit, and that adjusts for each pixel a coefficient of an enhancement filter according to the determined level; and an enhancement-filter applying unit that applies the enhancement filter of which coefficient is adjusted for each pixel by the coefficient adjusting unit, to the pixel forming the interpolated frame.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a sequence diagram of a process procedure performed by the video signal processing device according to the first embodiment;

FIG. 7 is a flowchart of the process procedure performed by the video signal processing device according to the first embodiment;

DESCRIPTION OF EMBODIMENTS

Exemplary embodiments of a video signal processing device, a video signal processing method, and a video signal processing program according to the present invention will be explained below in detail with reference to the accompanying drawings. An outline of a video signal processing device according to a first embodiment is explained first, and a configuration, process procedures, and effects of the video signal processing device according to the first embodiment are explained next. Thereafter, other embodiments will be explained.

Figure 1:
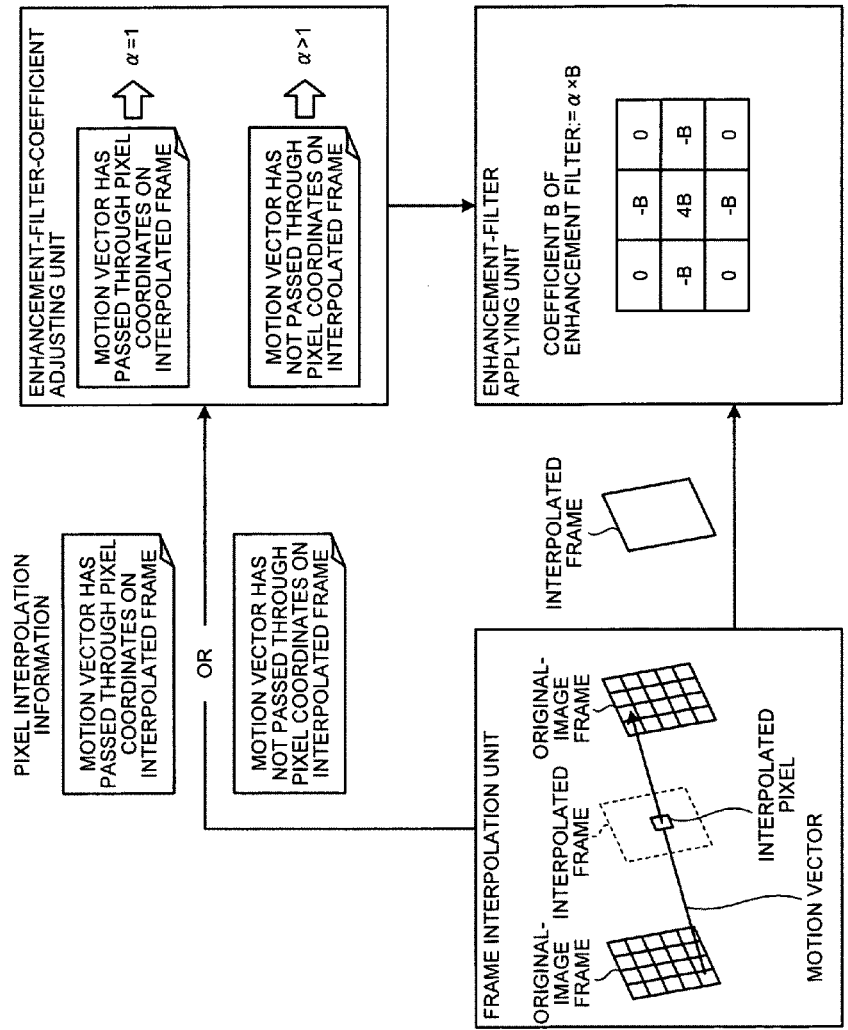
FIG. 1 is a schematic diagram for explaining an outline of a video signal processing device according to a first embodiment.

First, the outline of the video signal processing device according to the first embodiment is explained with reference to FIG. 1. FIG. 1 is a schematic diagram for explaining the outline of the video signal processing device. In the first embodiment, while it is assumed that the video signal processing device generates an interpolated frame for double-speed display, the present invention is not limited thereto, and can be also similarly applied to quadruple-speed display and quintuple-speed display.

As depicted in FIG. 1, in the video signal processing device according to the first embodiment, a frame interpolation unit generates an interpolated frame between original-image frames. At this time, the frame interpolation unit generates pixel interpolation information indicating for each interpolated pixel a process how the pixel is generated.

For example, the frame interpolation unit searches a motion vector between original-image frames, and generates each interpolated pixel by using the searched motion vector. At this time, the frame interpolation unit generates information of "a motion vector has passed through the pixel coordinates on the interpolated frame" or information of "a motion vector has not passed through the pixel coordinates on the interpolated frame", for the pixel interpolation information indicating processes how the pixel is generated.

Next, as depicted in FIG. 1, in the video signal processing device, an enhancement-filter-coefficient adjusting unit determines for each interpolated pixel an enhancement level to be applied to the interpolated pixel, by using the pixel interpolation information, and adjusts for each interpolated pixel a coefficient of the enhancement filter according to a determined level.

When the pixel interpolation information is the information of "a motion vector has passed through the pixel coordinates on the interpolated frame", for example, the enhancement-filter-coefficient adjusting unit determines that the enhancement level to be applied to the interpolated pixel is not increased. The enhancement-filter-coefficient adjusting unit adjusts the coefficient of the enhancement filter to "α=1".

Further, when the pixel interpolation information is the information of "a motion vector has not passed through the pixel coordinates on the interpolated frame", for example, the enhancement-filter-coefficient adjusting unit determines that the enhancement level to be applied to the interpolated pixel should be increased. The enhancement-filter-coefficient adjusting unit then adjusts the coefficient of the enhancement filter to "α>1".

As depicted in FIG. 1, in the video signal processing device, an enhancement-filter applying unit applies an enhancement filter having a coefficient adjusted for each interpolated pixel, to each interpolated pixel that forms an interpolated frame.

For example, the enhancement-filter applying unit calculates a coefficient "B" of the enhancement filter by using the coefficient "α=1" adjusted for each interpolated pixel, and applies the coefficient "B" to a corresponding interpolated pixel. Further, for example, the enhancement-filter applying unit calculates the coefficient "B" of the enhancement filter by using the coefficient "α>1" adjusted for each interpolated pixel, and applies the coefficient "B" to a corresponding interpolated pixel.

As explained above, the video signal processing device according to the first embodiment adjusts the coefficient of the enhancement filter for each interpolated pixel, by using the pixel interpolation information indicating the generating process for each interpolation process. The video signal processing device applies the enhancement filter to each interpolated pixel. Therefore, the video signal processing device can perform proper enhancement processing on the stream into which interpolated frames are inserted.

For example, in a process in which the pixel is interpolated, when a motion vector has not passed through the pixel coordinates on the interpolated frame, blur is considered to occur in the interpolated pixel. On the other hand, when a motion vector passed through the pixel coordinates on the interpolated frame, blur is not considered to occur in the interpolated pixel. As described above, blur of the interpolated frame does not uniformly occur in all interpolated pixels. In this respect, the video signal processing device according to the first embodiment determines whether blur occurs in the interpolated pixel, based on the process in which the pixel is interpolated. Consequently, the stream can be properly enhanced by adjusting such that a still text subtitle is not enhanced, for example.

Figure 2:
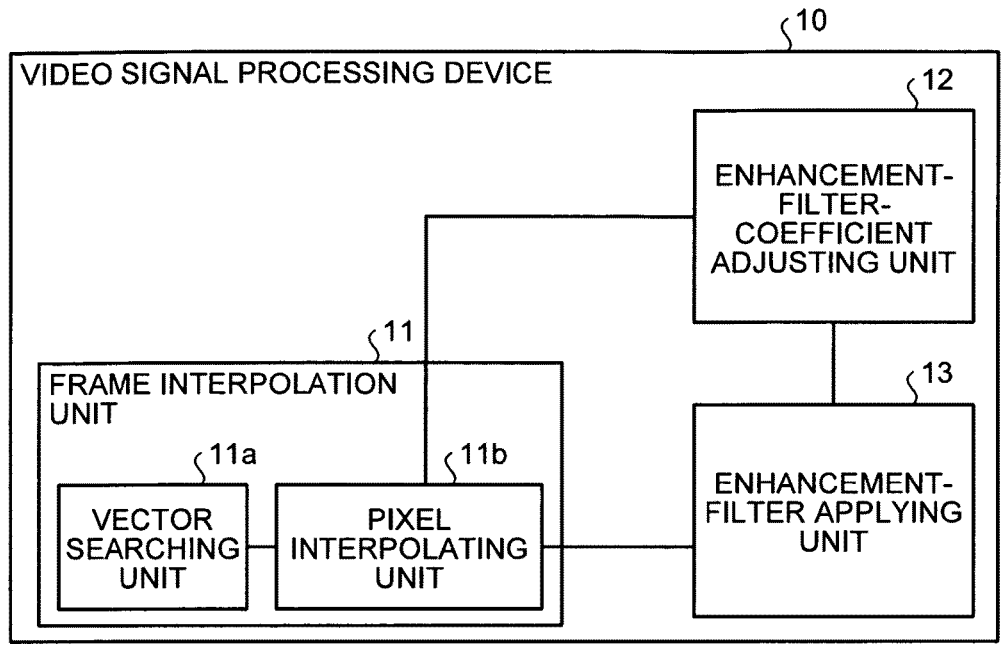
FIG. 2 is a block diagram of a configuration of the video signal processing device according to the first embodiment.

The configuration of the video signal processing device according to the first embodiment is explained with reference to FIGS. 2 to 5. FIG. 2 is a block diagram of the configuration of the video signal processing device.

As depicted in FIG. 2, a video signal processing device 10 according to the first embodiment includes a frame interpolation unit 11, an enhancement-filter-coefficient adjusting unit 12, and an enhancement-filter applying unit 13.

The frame interpolation unit 11 generates an interpolated frame between original-image frames, and generates pixel interpolation information indicating for each pixel a process in which the interpolated pixel forming the interpolated frame is generated. Specifically, the frame interpolation unit 11 includes a vector searching unit 11a, and a pixel interpolating unit 11b.

The vector searching unit 11a is connected to the pixel interpolating unit 11b, and searches a motion vector between original-image frames. Specifically, the vector searching unit 11a searches a motion vector between the original-image frames of an input original-image stream, and notifies the searched motion vector to the pixel interpolating unit 11b. In the first embodiment, the vector searching unit 11a searches a motion vector of one frame, and notifies the motion vector of the one frame to the pixel interpolating unit 11b.

Figure 3:
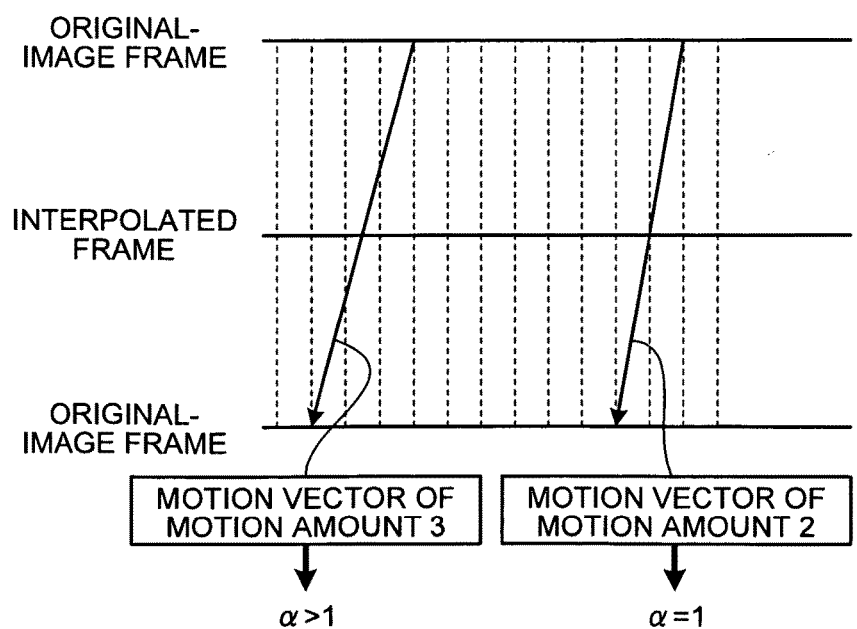
FIG. 3 is a schematic diagram for explaining a motion vector search.

A motion vector search performed by the vector searching unit 11a is explained with reference to FIG. 3. FIG. 3 is a schematic diagram for explaining a motion vector search. Out of three solid lines in a horizontal direction in FIG. 3, top and bottom solid lines represent original-image frames used to search a motion vector, and an intermediate solid line represents a frame to be interpolated. Dotted lines in a vertical direction represent pixel coordinates as positions where pixels are present.

As depicted in FIG. 3, the vector searching unit 11a searches a motion vector between original-image frames, by using a vector search based on block matching used by the MPEG (Moving Picture Experts Group), for example. That is, the vector searching unit 11a divides the original-image frame into blocks, and searches a block unit for a motion vector. The vector searching unit 11a can also search a pixel unit for a motion vector.

When a motion vector searched by the vector searching unit 11a is a left motion vector, the vector searching unit 11a searches a vector of a motion amount 3 in a left direction. When a motion vector searched by the vector searching unit 11a is a right motion vector, the vector searching unit 11a searches a vector of a motion amount 2 in a left direction. As depicted in FIG. 3, the left motion vector does not pass through the pixel coordinates on the interpolated frame. On the other hand, as depicted in FIG. 3, the right motion vector passes through the pixel coordinates on the interpolated frame.

The pixel interpolating unit 11b is connected to the vector searching unit 11a, the enhancement-filter-coefficient adjusting unit 12, and the enhancement-filter applying unit 13. The pixel interpolating unit 11b generates an frame to be interpolated, and pixel interpolation information. Specifically, the pixel interpolating unit 11b generates an interpolated pixel and pixel interpolation information by using a motion vector notified from the vector searching unit 11a. When the pixel interpolating unit 11b generates an interpolated frame by generating an interpolated pixel of one frame, the pixel interpolating unit 11b transmits the interpolated frame to the enhancement-filter applying unit 13. When the pixel interpolating unit 11b generates pixel interpolation information of one frame by generating an interpolated pixel in one frame, the pixel interpolating unit 11b notifies the generated pixel interpolation information to the enhancement-filter-coefficient adjusting unit 12.

Figures 4, 5A, 5B:
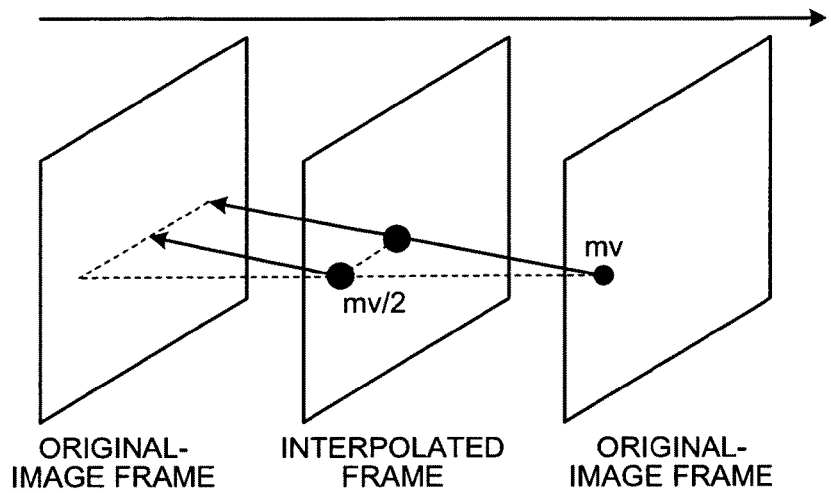
FIG. 4 is a schematic diagram for explaining generation of an interpolated pixel.
FIGS. 5A and 5B are schematic diagrams for explaining adjustment of a coefficient of an enhancement filter.

Generation of an interpolated pixel by the pixel interpolating unit 11b is explained with reference to FIG. 4. FIG. 4 is a schematic diagram for explaining generation of an interpolated pixel. When a motion vector notified from the vector searching unit 11a passes through the pixel coordinates on the interpolated frame (see the motion vector at the right side in FIG. 3), the pixel interpolating unit 11b moves an existing pixel in parallel to generate a pixel to be interpolated. For example, as depicted in FIG. 4, when an end point of an "mv/2" vector which is a half size of a motion vector "mv" is on the pixel coordinates, the pixel interpolating unit 11b moves the existing pixel in the original image frame in parallel to the motion vector "mv" to generate the interpolated pixel.

On the other hand, when a motion vector notified from the vector searching unit 11a does not pass through the pixel coordinates on the interpolated frame (see the motion vector at the left side in FIG. 3), the pixel interpolating unit 11b generate an interpolated pixel by calculation by using a near existing pixel. For example, as depicted in FIG. 4, when an end point of the "mv/2" vector is not on the pixel coordinates, the pixel interpolating unit 11b generates an interpolated pixel by performing a bilinear interpolation calculation using four existing pixels near the end point of the motion vector "mv/2". In this process, the interpolated pixel is generated by applying a lowpass filter. Therefore, blur occurs in the generated interpolated pixel.

Generation of pixel interpolation information performed by the pixel interpolating unit 11b is explained next. The pixel interpolating unit 11b according to the first embodiment generates the information of "a motion vector has passed through the pixel coordinates on the interpolated frame" or the information of "a motion vector has not passed through the pixel coordinates on the interpolated frame", for the pixel interpolation information. This information is generated by determining whether a quotient obtained by dividing a motion vector notified from the vector searching unit 11a by 2 is an integer, for example.

The pixel interpolating unit 11b can be arranged to notify only vector information used to generate the interpolated pixel to the enhancement-filter-coefficient adjusting unit 12, for the pixel interpolation information. In this case, the enhancement-filter-coefficient adjusting unit 12 determines whether the quotient obtained by dividing a motion vector by 2 is an integer, and determines whether "a motion vector has passed through the pixel coordinates on the interpolated frame" or "a motion vector has not passed through the pixel coordinates on the interpolated frame".

The enhancement-filter-coefficient adjusting unit 12 is connected to the pixel interpolating unit 11b and the enhancement-filter applying unit 13. The enhancement-filter-coefficient adjusting unit 12 determines for each interpolated pixel an enhancement level to be applied to the interpolated pixel by using the pixel interpolation information, and adjusts a coefficient of an enhancement filter according to a determined level. Specifically, the enhancement-filter-coefficient adjusting unit 12 determines for each interpolated pixel the enhancement level by using the pixel interpolation information notified from the pixel interpolating unit 11b, adjusts the coefficient of the enhancement filter for each interpolated pixel, and notifies the adjusted coefficient of one frame to the enhancement-filter applying unit 13.

Adjustment of a coefficient of an enhancement filter performed by the enhancement-filter-coefficient adjusting unit 12 is explained with reference to FIGS. 5A and 5B. FIGS. 5A and 5B are schematic diagrams for explaining the adjustment of the coefficient of the enhancement filter. In the first embodiment, the enhancement-filter applying unit 13 uses an enhancement filter depicted in FIG. 5A and calculates the coefficient "B" of the enhancement filter by the equation depicted in FIG. 5B. "B" is a positive number, and a differential value of near four pixels works as an enhancement coefficient. The enhancement-filter-coefficient adjusting unit 12 adjusts the coefficient "α" for each interpolated pixel, thereby adjusting the coefficient of the enhancement filter for each interpolated pixel.

When the pixel interpolation information indicates that a motion vector passes the pixel coordinates on the interpolation filter, for example, the enhancement-filter-coefficient adjusting unit 12 determines that an enhancement level to be applied to the interpolated pixel is not changed, and adjusts the coefficient to the coefficient "α=1". Thus, the coefficient "B" of the enhancement filter calculated by the equation depicted in FIG. 5B does not change. As a result, the level of enhancement to be applied to the interpolated pixel does not change either.

On the other hand, when the pixel interpolation information indicates that a motion vector does not pass through the pixel coordinates on the interpolation filter, for example, the enhancement-filter-coefficient adjusting unit 12 determines that the enhancement level to be applied to the interpolated pixel is increased, and adjusts the coefficient to the coefficient "α>1". The coefficient "B" of the enhancement filter calculated by the equation depicted in FIG. 5B has a large value. As a result, the level of enhancement to be applied to the interpolated pixel increases.

The enhancement-filter applying unit 13 is connected to the pixel interpolating unit 11b and the enhancement-filter-coefficient adjusting unit 12, and applies an enhancement filter of which coefficient is adjusted for each interpolated pixel, to each interpolated pixel forming an interpolated frame. Specifically, the enhancement-filter applying unit 13 applies for each interpolated pixel the enhancement filter to the interpolated frame of one frame transmitted from the pixel interpolating unit 11b, by using a coefficient of one frame notified from the enhancement-filter-coefficient adjusting unit 12.

For example, when the enhancement-filter applying unit 13 applies an enhancement filter to the interpolated frame of one frame, the enhancement-filter applying unit 13 calculates for each interpolated pixel the coefficient "B" of the enhancement filter entirely in a frame by using the coefficient "α" of entirely one frame notified from the enhancement-filter-coefficient adjusting unit 12. The enhancement-filter applying unit 13 then applies the coefficient "B" of the enhancement filter entirely in a frame calculated for each interpolated pixel to the interpolated frame of entirely one frame for each interpolated pixel.

A process procedure performed by the video signal processing device according to the first embodiment is explained next with reference to FIGS. 6 and 7. FIG. 6 is a sequence diagram of the process procedure performed by the video signal processing device, and FIG. 7 is a flowchart of the process procedure performed by the video signal processing device.

As depicted in FIG. 6, in the video signal processing device 10, the vector searching unit 11a searches a motion vector between the original-image frames (Step S101), and notifies the searched motion vector to the pixel interpolating unit 11b (Step S102).

The pixel interpolating unit 11b then generates an interpolated pixel and pixel interpolation information (Step S103), and generates an interpolated frame of one frame (Step S104). The pixel interpolating unit 11b transmits the generated interpolated frame to the enhancement-filter applying unit 13 (Step S105), and notifies the generated pixel interpolation information to the enhancement-filter-coefficient adjusting unit 12 (Step S106).

Subsequently, the enhancement-filter-coefficient adjusting unit 12 determines for each interpolated pixel the level of enhancement to be applied to the interpolated pixel by using the notified pixel interpolation information (Step S107), and adjusts for each interpolated pixel a coefficient of an enhancement filter according to the determined level (Step S108). The enhancement-filter-coefficient adjusting unit 12 notifies the adjusted coefficient of the enhancement filter to the enhancement-filter applying unit 13 (Step S109).

On the other hand, the enhancement-filter applying unit 13 applies the enhancement filter by using the coefficient notified from the enhancement-filter-coefficient adjusting unit 12, to each interpolated pixel forming the interpolated frame transmitted from the pixel interpolating unit 11b (Step S110).

The entire process procedure performed by the video signal processing device 10 is explained next with reference to FIG. 7. The video signal processing device 10 searches a motion vector (Step S201), generates pixel interpolation information (Step S202), and determines whether a quotient obtained by dividing the motion vector by 2 is an integer (Step S203). By determining whether the quotient obtained by dividing the motion vector by 2 is an integer, the video signal processing device 10 determines a process in which the interpolated pixel is generated, and determines whether the level of enhancement should be increased.

When the quotient obtained by dividing the motion vector by 2 is an integer (Yes at Step S203), the interpolated pixel is generated by moving an existing pixel in parallel. Therefore, the enhancement level of this interpolated pixel should not be increased. Accordingly, the video signal processing device 10 adjusts the coefficient of the enhancement filter to "α=1" (Step S204). On the other hand, when the quotient obtained by dividing the motion vector by 2 is not an integer (No at Step S203), the interpolated pixel is generated by applying a low-pass filter. Therefore, the enhancement level of this interpolated pixel should be increased. Accordingly, the video signal processing device 10 adjusts the coefficient of the enhancement filter to "α>1" (Step S205).

Thereafter, the video signal processing device 10 calculates the coefficient "B" of the enhancement filter for each interpolated pixel (Step S206), and applies the enhancement filter to each interpolated pixel (Step S207).

As described above, the video signal processing device 10 generates an interpolated frame between original-image frames formed by an existing video signal. The frame interpolation unit 11 generates pixel interpolation information indicating for each interpolated pixel a process in which the interpolated pixel forming the interpolated frame is generated. The enhancement-filter-coefficient adjusting unit 12 determines for each interpolated pixel a level of enhancement to be applied to the interpolated pixel by using the pixel interpolation information, and adjusts for each interpolated pixel the coefficient of the enhancement filter according to the determined level. The enhancement-filter applying unit 13 applies the enhancement filter of which coefficient is adjusted for each interpolated pixel, to each interpolated pixel forming the interpolated frame.

As described above, the video signal processing device 10 adjusts for each interpolated pixel the coefficient of the enhancement filter by using the pixel interpolation information indicating a generating process for each interpolated pixel, and applies the enhancement filter to each interpolated pixel. As a result, the video signal processing device 10 can perform proper processing on a stream into which interpolated frames are inserted.

For example, in the process in which an interpolated pixel is generated, when a motion vector does not pass through the pixel coordinates on the interpolated frame, blur is considered to occur in the generated interpolated pixel. On the other hand, when a motion vector passes through the pixel coordinates on the interpolated frame, blur is not considered to occur in the generated interpolated pixel. As described above, blur of an interpolated frame does not uniformly occur in all interpolated pixels. In this respect, the video signal processing device 10 determines whether blur occurs in the interpolated pixel by using the information about how the interpolated pixel in the interpolated frame is generated, and thereafter, the video signal processing device 10 adjusts the coefficient of the enhancement filter for each interpolated pixel. Consequently, the stream can be properly enhanced by adjusting such that a still text subtitle is not enhanced, for example.

Further, the frame interpolation unit 11 according to the first embodiment generates information indicating whether a motion vector searched between the original-image frames passes through the pixel coordinates on the interpolated frame, for the pixel interpolation information. When the pixel interpolation information indicates that a motion vector does not pass through the pixel coordinates on the interpolated frame, the enhancement-filter-coefficient adjusting unit 12 determines that the level of enhancement to be applied to the pixel represented by the pixel interpolation information should be increased. The enhancement-filter-coefficient adjusting unit 12 adjusts the coefficient according to a determined level.

As described above, the video signal processing device 10 uses information of a motion vector for the pixel interpolation information. Therefore, when generation of an interpolated pixel is performed by searching a motion vector, the video signal processing device 10 can perform proper enhancement processing on a stream into which interpolated frames are inserted.

The video signal processing device according to the first embodiment explained above generates an interpolated frame by searching a motion vector in one direction between original-image frames. A video signal processing device according to a second embodiment of the present invention generates an interpolated frame by searching motion vectors in both directions. Therefore, the video signal processing device according to the second embodiment further uses a relationship between searched two motion vectors, at the time of determining the level of enhancement based on a process in which an interpolated pixel is generated.

Figure 8:
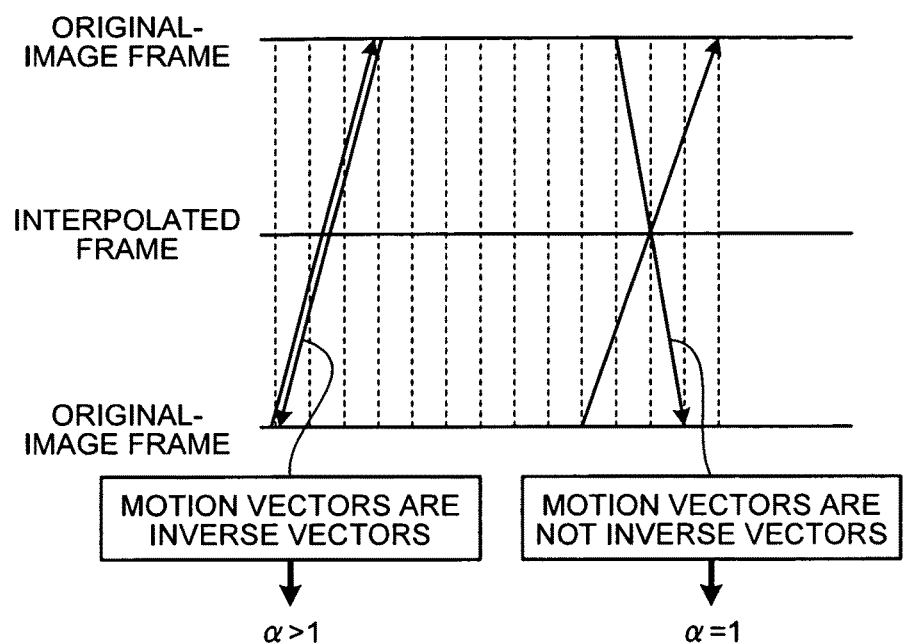
FIG. 8 is a schematic diagram for explaining a motion vector search according to a second embodiment.

A motion vector search according to the second embodiment is explained with reference to FIG. 8. FIG. 8 is a schematic diagram for explaining the motion vector search according to the second embodiment. When motion vectors searched by the vector searching unit 11a are left motion vectors, these motion vectors have an inverse vector relation that one of two motion vectors has an inverse vector of the other motion vector. When motion vectors searched by the vector searching unit 11a are right motion vectors, one of two motion vectors does not have an inverse vector of the other motion vector. The inverse vector means a relationship between two vectors that only directions of the vectors are different, as depicted at the left side in FIG. 8.

When one of two motion vectors is in a relationship of an inverse vector of the other motion vector, reliability of the motion vectors is considered to be high. Therefore, the pixel interpolating unit 11b generates an interpolated pixel based on these motion vectors. On the other hand, when one of two motion vectors is not in a relationship of an inverse vector of the other motion vector, reliability of the motion vectors is considered to be low. Therefore, the pixel interpolating unit 11b generates an interpolated pixel by a method of decreasing an error by further blending interpolated pixels generated by using two motion vectors. In other words, when a relationship of an inverse vector is not obtained, the pixel interpolating unit 11b intentionally generates blur in the interpolated pixel.

Therefore, the enhancement-filter-coefficient adjusting unit 12 determines whether a motion vector passes through the pixel coordinates on the interpolated frame, and also determines whether one of the two motion vectors is in a relationship of an inverse vector of the other motion vector. When the pixel interpolation information indicates that one of the two motion vectors is not in a relationship of an inverse vector of the other motion vector, the enhancement-filter-coefficient adjusting unit 12 determines that the level of enhancement to be applied to the interpolated pixel is not changed regardless of whether the motion vector passes through the pixel coordinates. The enhancement-filter-coefficient adjusting unit 12 adjusts the coefficient to "α=1". Alternatively, the enhancement-filter-coefficient adjusting unit 12 can be arranged to determine to lower the level of enhancement instead of determining not to change the level of enhancement. In this case, the enhancement-filter-coefficient adjusting unit 12 adjusts the coefficient to "α<1".

Figure 9:
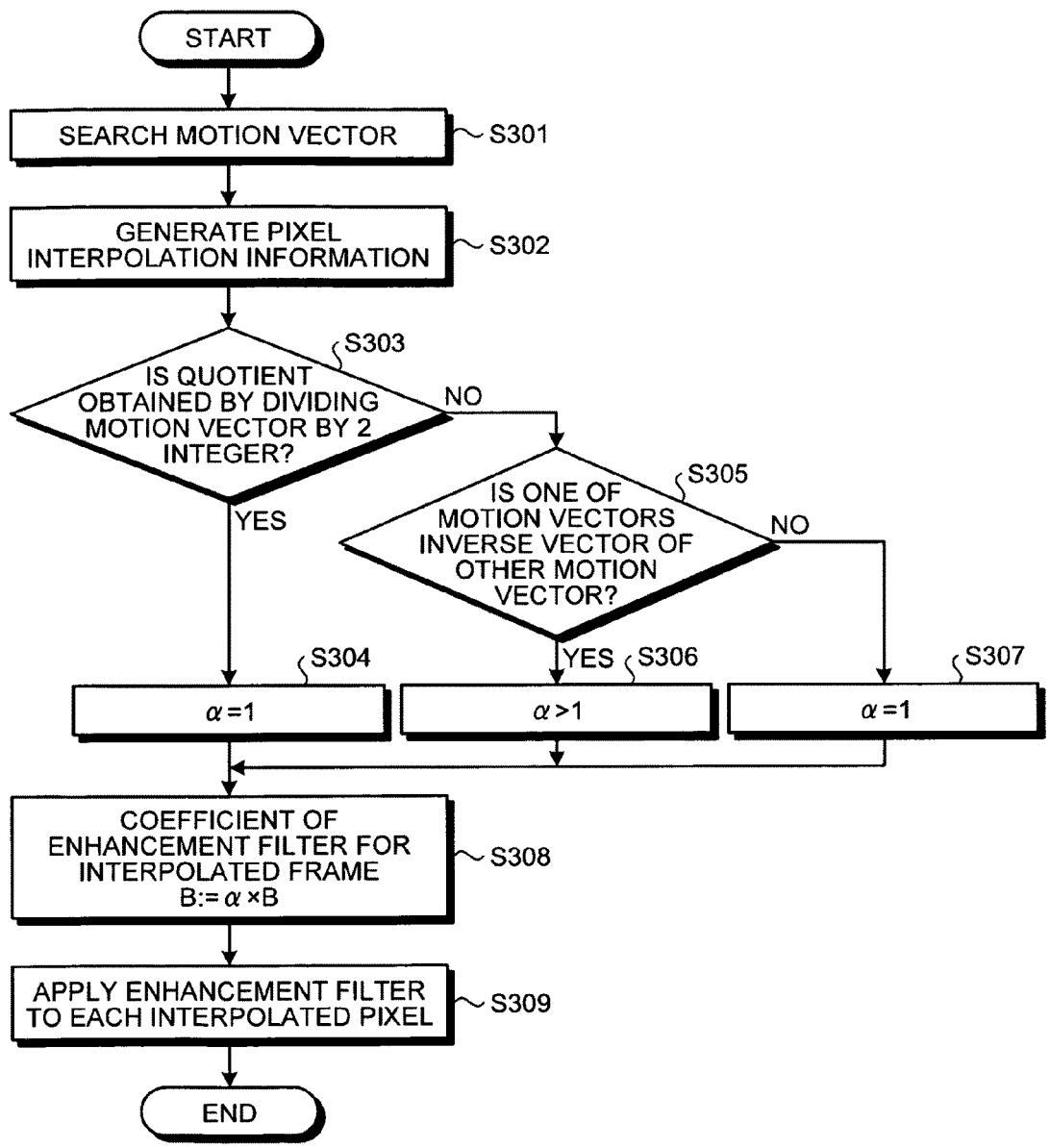
FIG. 9 is a flowchart of a process procedure performed by a video signal processing device according to the second embodiment.

This feature is explained with reference to FIG. 9. FIG. 9 is a flowchart of a process procedure performed by the video signal processing device according to the second embodiment. The video signal processing device 10 searches a motion vector (Step S301), generates pixel interpolation information (Step S302), and determines whether a quotient obtained by dividing a motion vector by 2 is an integer (Step S303).

When the quotient obtained by dividing a motion vector by 2 is an integer (Yes at Step S303), an interpolated pixel is generated by moving an existing pixel in parallel. Therefore, an enhancement level of the interpolated pixel should not be increased. Accordingly, the video signal processing device 10 adjusts a coefficient of an enhancement filter to "α=1" (Step S304).

On the other hand, when the quotient obtained by dividing a motion vector by 2 is not an integer (No at Step S303), the video signal processing device 10 according to the second embodiment further determines whether one of two motion vectors is in a relationship of an inverse vector of the other motion vector (Step S305).

When one of the two motion vectors is in a relationship of an inverse vector of the other motion vector (Yes at Step S305), the enhancement level of the interpolated pixel should be increased. Therefore, the video signal processing device 10 adjusts the coefficient of the enhancement filter to "α>1" (Step S306). On the other hand, when one of the two motion vectors is not in a relationship of an inverse vector of the other motion vector (No at Step S305), blur is considered to be intentionally generated in the interpolated pixel, and the enhancement level of the interpolated pixel should not be increased. Therefore, the video signal processing device 10 adjusts the coefficient to "α=1" (Step S307).

Thereafter, the video signal processing device 10 calculates the coefficient "B" of the enhancement filter for each interpolated pixel (Step S308), and applies the enhancement filter to each interpolated pixel (Step S309).

As described above, the frame interpolation unit 11 according to the second embodiment indicates whether a motion vector passes through the pixel coordinates on the interpolated frame, and also generates pixel interpolation information indicating whether one of two motion vectors is in a relationship of an inverse vector of the other motion vector. When the pixel interpolation information indicates that one of the two motion vectors is not in a relationship of an inverse vector of the other motion vector, the enhancement-filter-coefficient adjusting unit 12 determines not to increase the enhancement level, and adjusts the coefficient according to the determined level.

As described above, the video signal processing device 10 uses information indicating whether two motion vectors are in a relationship of inverse vectors, for the pixel interpolation information. Therefore, when generation of an interpolated pixel is performed by searching motion vectors in both directions, the video signal processing device 10 can perform proper enhancement processing on a stream into which interpolated frames are inserted.

While the first and second embodiments have been explained above, the present invention can be carried out by various different embodiments other than the above embodiments.

In the first and second embodiments, a fixed value is assumed to be used for the coefficient "B" of the enhancement filter, as depicted in FIG. 5B. However, the present invention is not limited thereto. The coefficient "B" of the enhancement filter can be calculated for each interpolated pixel, and different values can be used for each interpolated pixel.

Figure 10:
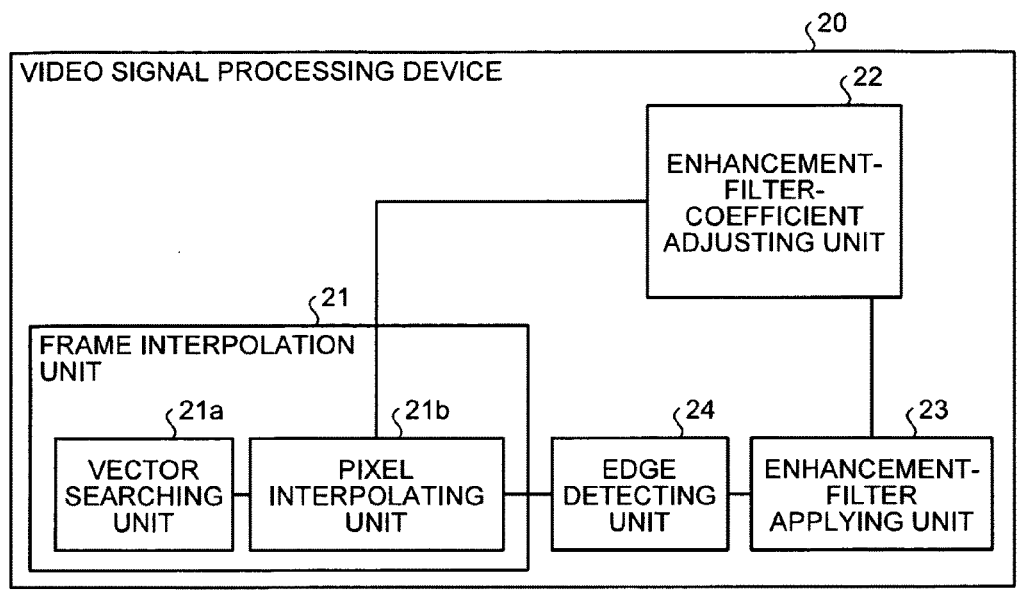
FIG. 10 is a block diagram of a configuration of a video signal processing device according to a third embodiment.

A third embodiment of the present invention is briefly explained with reference to FIG. 10. FIG. 10 is a block diagram of a configuration of a video signal processing device according to the third embodiment. As depicted in FIG. 10, a video signal processing device 20 according to the third embodiment further includes an edge detecting unit 24 at a prestage of an enhancement-filter applying unit 23. A frame interpolation unit 21, an enhancement-filter-coefficient adjusting unit 22, and the enhancement-filter applying unit 23 depicted in FIG. 10 correspond to the frame interpolation unit 11, the enhancement-filter-coefficient adjusting unit 12, and the enhancement-filter applying unit 13, respectively depicted in FIG. 2.

The edge detecting unit 24 detects for each interpolated pixel an edge amount of each interpolated pixel forming an interpolated frame, in the interpolated frame transmitted from a pixel interpolating unit 21b. To detect the edge-like characteristics, application of a Laplacian operator to peripheral 3×3 pixels is known, for example. The edge detecting unit 24 then calculates the coefficient "B" of the enhancement filter from a detected edge-like characteristics for each interpolated pixel. When the edge detecting unit 24 calculates the coefficient "B" of the enhancement filter for one frame, the edge detecting unit 24 transmits the interpolated frame to the enhancement-filter applying unit 23, and notifies the calculated coefficient "B" of the enhancement filter for one frame to the enhancement-filter applying unit 23.

The enhancement-filter applying unit 23 calculates for each interpolated pixel the coefficient "B" of the enhancement filter notified from the edge detecting unit 24 by using the coefficient "α" notified from the enhancement-filter-coefficient adjusting unit 22. The enhancement-filter applying unit 23 calculates the coefficient "B" of the enhancement filter for one frame, and applies the calculated coefficient "B" of the enhancement filter to each interpolated pixel forming the interpolated frame.

Figure 11:
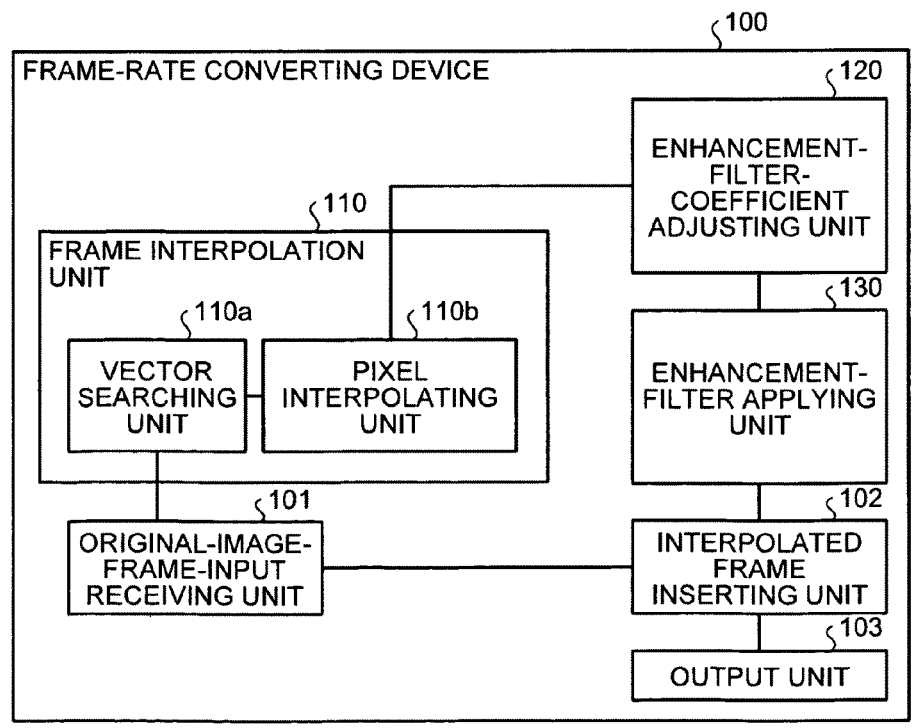
FIG. 11 is a schematic diagram for explaining a frame-rate converting device.
Figure 12:
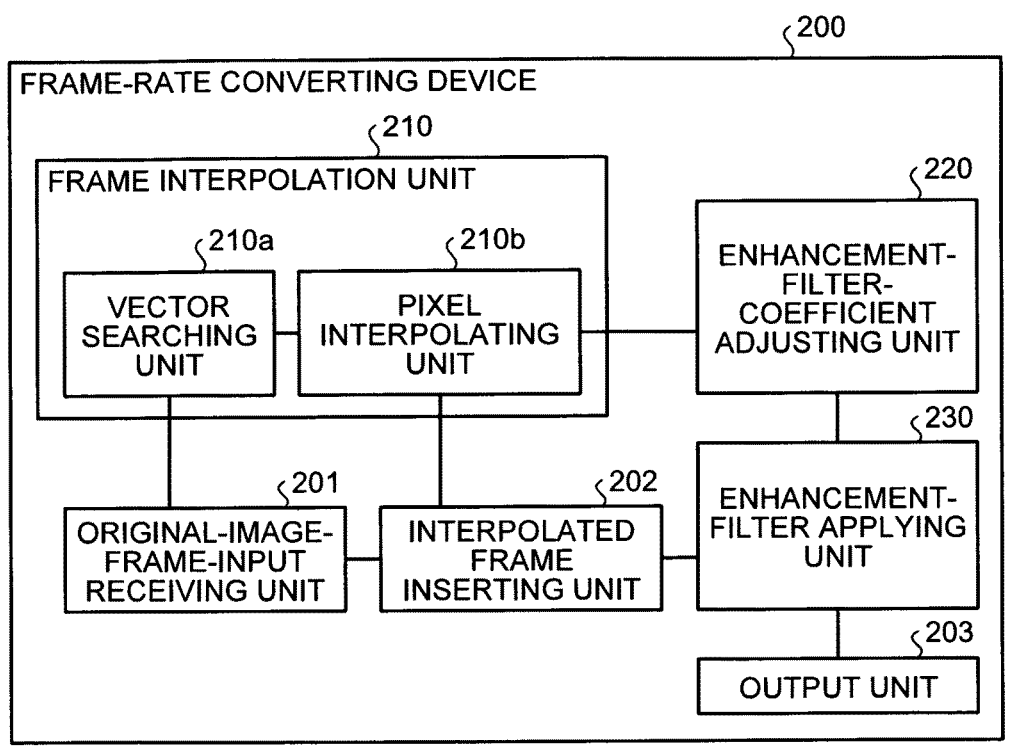
FIG. 12 is another schematic diagram for explaining the frame-rate converting device.

The video signal processing device described above may be implemented as a part of a frame-rate converting device as depicted in FIG. 11 and FIG. 12, for example. That is, as depicted in FIG. 11, a frame-rate converting device 100 includes an original-image-frame-input receiving unit 101, an interpolated frame inserting unit 102, and an output unit 103, in addition to a frame interpolation unit 110, an enhancement-filter-coefficient adjusting unit 120, and an enhancement-filter applying unit 130. The frame interpolation unit 110, the enhancement-filter-coefficient adjusting unit 120, and the enhancement-filter applying unit 130 depicted in FIG. 11 correspond to the frame interpolation unit 11, the enhancement-filter-coefficient adjusting unit 12, and the enhancement-filter applying unit 13, respectively depicted in FIG. 2.

The original-image-frame-input receiving unit 101 receives input of a video stream of an original-image frame, and transmits the input-received original-image frame to a vector searching unit 110a. The original-image-frame-input receiving unit 101 also transmits the input-received original-image frame to the interpolated-frame inserting unit 102. The interpolated frame inserting unit 102 inserts the interpolated frame applied with the enhancement filter by the enhancement-filter applying unit 130, between original-image frames transmitted from the original-image-frame-input receiving unit 101, and transmits the interpolated frame to the output unit 103. The output unit 103 outputs a video stream having the interpolated frame inserted therein by the interpolated frame inserting unit 102.

When application of an enhancement filter is necessary to expand an image, the frame-rate converting device can be implemented as depicted in FIG. 12, for example. That is, as depicted in FIG. 12, a frame-rate converting device 200 can also include an interpolated frame inserting unit 202 following an enhancement-filter applying unit 230. A frame interpolation unit 210, an enhancement-filter-coefficient adjusting unit 220, and the enhancement-filter applying unit 230 depicted in FIG. 12 correspond to the frame interpolation unit 11, the enhancement-filter-coefficient adjusting unit 12, and the enhancement-filter applying unit 13, respectively depicted in FIG. 2.

The interpolated frame inserting unit 202 inserts an interpolated frame generated by a pixel interpolating unit 210b between original-image frames transmitted from an original-image-frame-input receiving unit 201, and transmits the generated interpolated frame to the enhancement-filter applying unit 230. The enhancement-filter applying unit 230 applies an enhancement filter of which coefficient is adjusted, to each interpolated pixel. As a result, the enhancement-filter applying unit 230 applies an enhancement filter ("α=1") of which coefficient is not adjusted, to the original-image frame. The enhancement-filter applying unit 230 transmits a video stream, to which the enhancement filter is applied, to an output unit 203. The output unit 203 outputs a video stream into which interpolated frames are inserted and to which the enhancement filter is applied.

As described above, the enhancement-filter applying unit 230 also has a function of a conventional enhancement-filter applying unit that applies an enhancement filter for enlarging and the like. Therefore, its cost can be reduced.

In the first and second embodiments, a coefficient is adjusted by determining whether enhancement should or should not be increased. However, the present invention is not limited thereto. For example, when motion vectors in both directions are not in a relationship of inverse vectors, the coefficient can be adjusted to "α<1" by determining that enhancement should be reduced.

The process procedures described in the present specification or depicted in the drawings (for example, FIGS. 6, 7, and 9), specific names, and information including various kinds of data and parameters can be arbitrarily changed unless otherwise specified.

Respective constituent elements of respective devices depicted in the drawings are functionally conceptual, and physically the same configuration depicted in the drawings (for example, FIGS. 2, 10, 11, and 12) is not always necessary. That is, the specific mode of distribution and integration of the devices are not limited to the depicted ones, and all or a part thereof can be functionally or physically distributed or integrated in an arbitrary unit, according to various kinds of load and the status of use. In addition, all or an arbitrary part of processing functions performed by the respective devices can be realized by a central processing unit (CPU) and a program analyzed and executed by the CPU, or can be realized as hardware by a wired logic.

Figure 13:
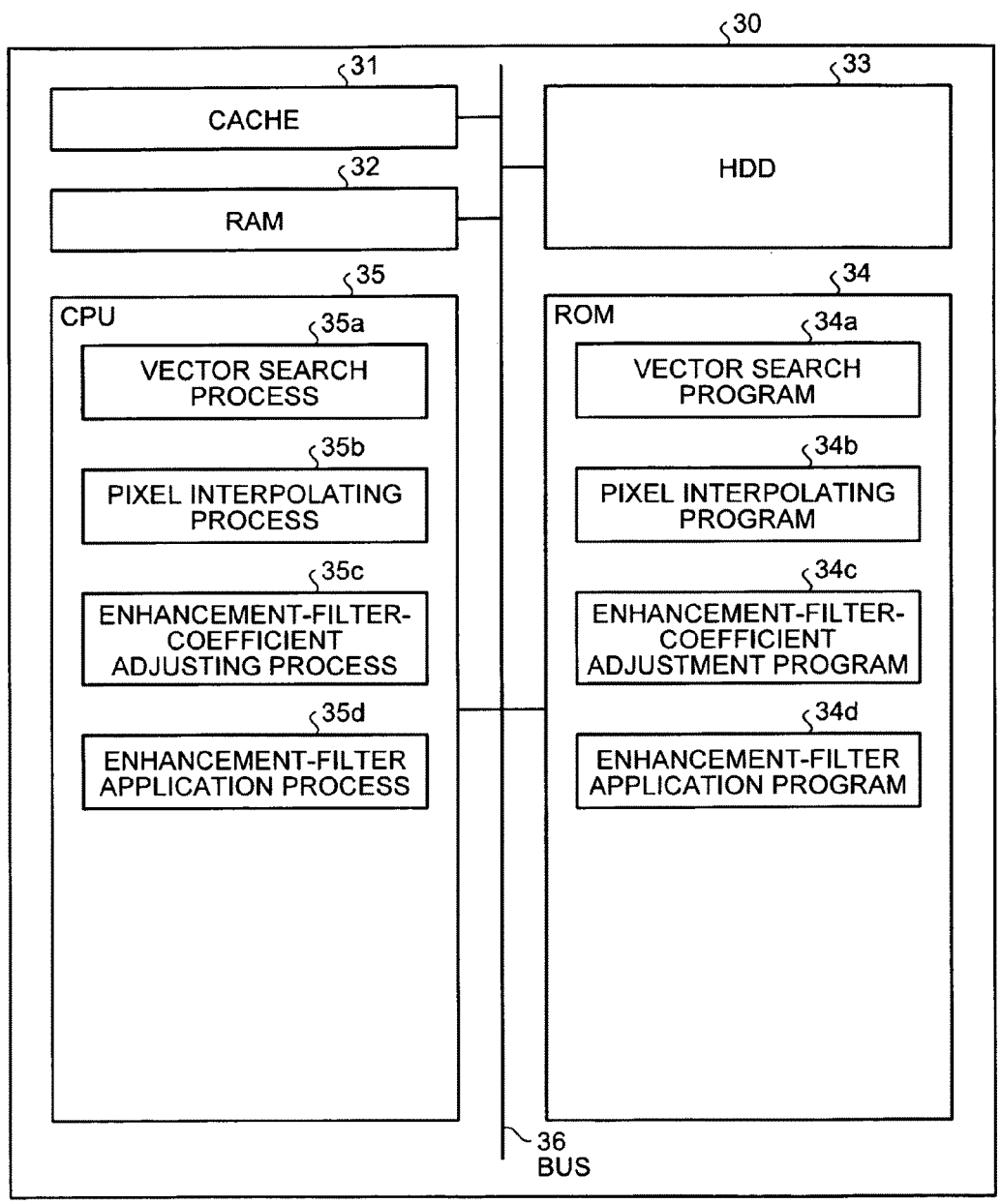
FIG. 13 depicts a computer that executes a video signal processing program.
Figure 14:
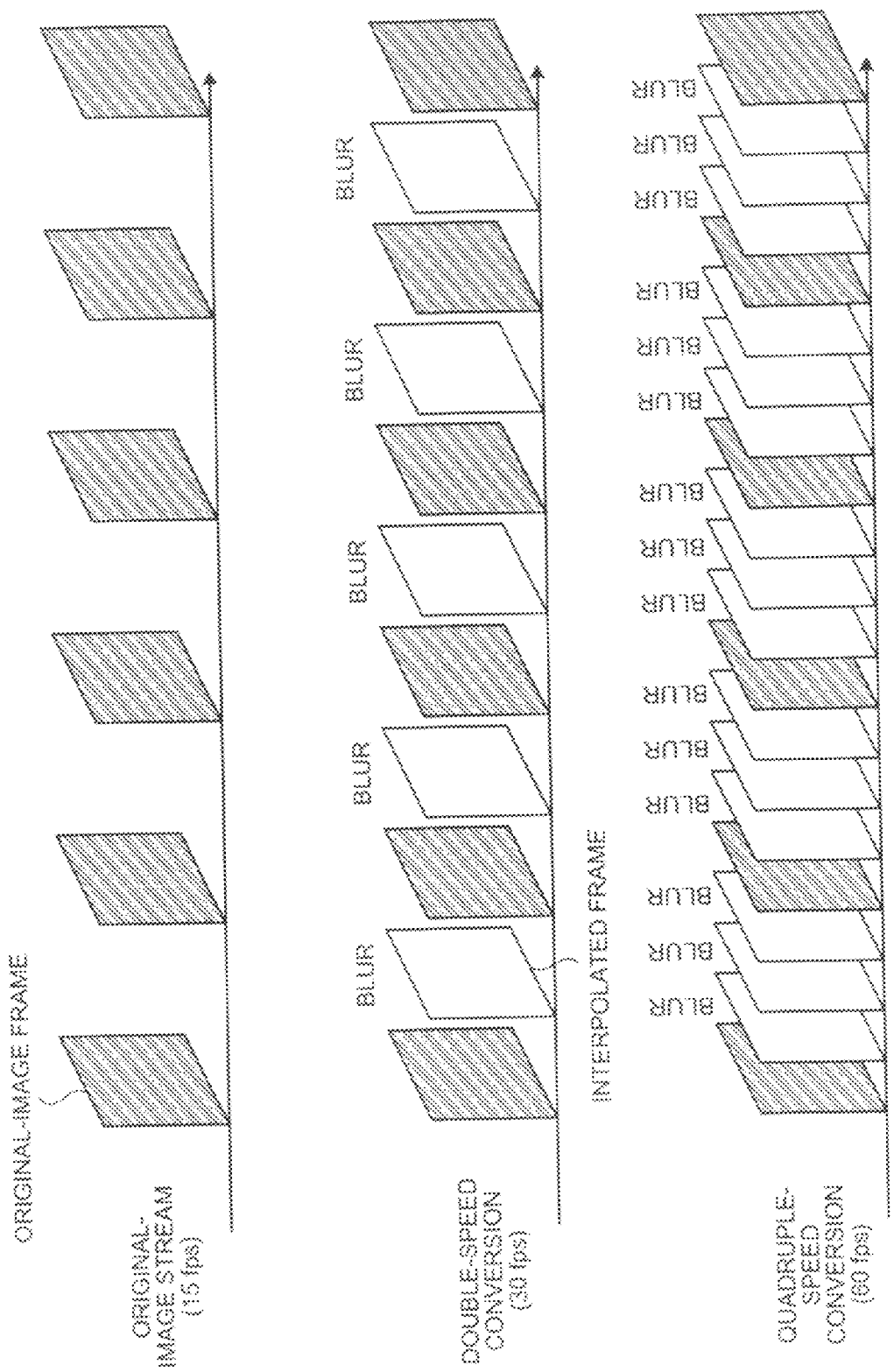
FIG. 14 is a schematic diagram for explaining a conventional technique.

A computer such as a personal computer and a workstation can perform various processes explained in the above embodiments by preparing programs in advance. One example of a computer that executes a video signal processing program having functions similar to those of the above embodiments is explained below with reference to FIG. 13. FIG. 13 depicts a computer that executes the video signal processing program.

As depicted in FIG. 13, a video signal processing program (computer) 30 includes a cache 31, a RAM (random access memory) 32, an HDD (hard disk drive) 33, a ROM (read only memory) 34, and a CPU 35 that are connected to each other by a bus 36. The ROM 34 includes a video signal processing program that exhibits functions similar to those of the above embodiments. That is, the ROM 34 includes a vector search program 34a, a pixel interpolation program 34b, an enhancement-filter-coefficient adjustment program 34c, and an enhancement-filter application program 34d, as depicted in FIG. 13.

The CPU 35 executes programs 34a to 34d by reading these programs. As depicted in FIG. 13, the programs 34a to 34d work as a vector search process 35a, a pixel interpolating process 35b, an enhancement-filter-coefficient adjusting process 35c, and an enhancement-filter application process 35d. The processes 35a to 35d correspond to the vector searching unit 11a, the pixel interpolating unit 11b, the enhancement-filter-coefficient adjusting unit 12, and the enhancement-filter applying unit 13, respectively.

Each of the programs 34a to 34d does not necessarily have to be stored in the ROM 34 in advance. For example, these programs can be stored in "a portable physical medium" such as an FD (flexible disk), a CD (compact disk)-ROM, an MO (magneto-optical) disk, a DVD (digital versatile disk), an optical magnetic disk, and an IC (integrated circuit) card inserted into the computer 30, "a fixed physical medium" such as an HDD provided inside or outside of the computer 30, or "another computer (or a server)" connected to the computer 30 via a public line, the Internet, a LAN (local area network), or a WAN (wide area network), and the computer reads and executes these programs from such a medium.

According to the embodiments, proper enhancement processing can be performed on a stream into which interpolated frames are inserted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A video signal processing device that generates an interpolated frame between original-image frames formed by existing video signals, the video signal processing device comprising:
a pixel-information generating unit that generates information indicating for a pixel forming the interpolated frame whether a motion vector searched between the original-image frames does not pass through pixel coordinates of the pixel on the interpolated frame;
a coefficient adjusting unit that determines for each pixel forming the interpolated frame, when the information indicates that the motion vector does not pass through the pixel coordinates on the interpolated frame, that
a level of enhancement to be applied to the pixel represented by the information be increased, and
adjusts for each pixel a coefficient of an enhancement filter according to the determined level; and
an enhancement-filter applying unit that applies the enhancement filter of which coefficient is adjusted for each pixel by the coefficient adjusting unit, to the pixel forming the interpolated frame.

2. The video signal processing device according to claim 1, wherein the video signal processing device searches the motion vector in both directions between the original-image frames and generates the interpolated frame,
the pixel-information generating unit generates information that indicates whether the motion vector searched between the original-image frames passes through or does not pass through the pixel coordinates on the interpolated frame, and indicates whether one of two motion vectors searched in both directions between the original-image frames is in a relationship of being an inverse vector of the other motion vector, as the information, and
when the information indicates that one of the two motion vectors searched in both directions between the original-image frames is not in a relationship of being an inverse vector of the other motion vector, even when the information indicates that the motion vector does not pass through the pixel coordinates on the interpolated frame, the coefficient adjusting unit determines that the level of enhancement is not increased, and adjusts the coefficient according to the determined level.

3. A video signal processing method that generates an interpolated frame between original-image frames formed by existing video signals, the video signal processing method comprising:
generating information indicating for a pixel forming the interpolated frame whether a motion vector searched between the original-image frames does not pass through pixel coordinates of the pixel on the interpolated frame;
determining for each pixel forming the interpolated frame, when the information indicates that the motion vector does not pass through the pixel coordinates on the interpolated frame, that
a level of enhancement to be applied to the pixel represented by the information be increased;
adjusting for each pixel a coefficient of an enhancement filter according to the determined level; and
applying the enhancement filter of which coefficient is adjusted for each pixel by the adjusting, to the pixel forming the interpolated frame.

4. A frame-rate converting device that converts a frame rate by inserting an interpolated frame between original-image frames, the frame-rate converting device comprising:
a frame interpolation unit that generates the interpolated frame for interpolating between the original-image frames;
a pixel-information generating unit that generates information indicating for a pixel forming the interpolated frame whether a motion vector searched between the original-image frames does not pass through pixel coordinates of the pixel on the interpolated frame;
a coefficient adjusting unit that determines for each pixel forming the interpolated frame, when the information indicates that the motion vector does not pass through the pixel coordinates on the interpolated frame, that
a level of enhancement to be applied to the pixel represented by the information be increased, and
adjusts for each pixel a coefficient of an enhancement filter according to the determined level;
an enhancement-filter applying unit that applies the enhancement filter of which coefficient is adjusted for each pixel by the coefficient adjusting unit, to the pixel forming the interpolated frame generated by the frame interpolation unit; and an interpolated frame inserting unit that inserts the interpolated frame, to which the enhancement filter is applied by the enhancement-filter applying unit, between the original-image frames.

* * * * *